(12) United States Patent
Wilhelm et al.

(10) Patent No.: US 9,171,152 B1
(45) Date of Patent: Oct. 27, 2015

(54) SYSTEMS AND METHODS FOR PREVENTING CHRONIC FALSE POSITIVES

(71) Applicant: Symantec Corporation, Mountain View, CA (US)

(72) Inventors: Jeffrey Wilhelm, Venice, CA (US); Joseph Chen, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/273,510

(22) Filed: May 8, 2014

(51) Int. Cl.
  *G06F 7/00* (2006.01)
  *G06F 12/14* (2006.01)
  *G06F 21/55* (2013.01)

(52) U.S. Cl.
  CPC .................................. *G06F 21/552* (2013.01)

(58) Field of Classification Search
  USPC .......................................................... 726/23
  See application file for complete search history.

(56) References Cited

U.S. PATENT DOCUMENTS

| | | | | |
|---|---|---|---|---|
| 7,555,495 | B2 * | 6/2009 | Chu ..................................... | 1/1 |
| 8,589,681 | B1 * | 11/2013 | Fanton et al. ................. | 713/165 |
| 2006/0212930 | A1 * | 9/2006 | Shull et al. ...................... | 726/10 |

OTHER PUBLICATIONS

"Embeds", http://codex.wordpress.org/Embeds, as accessed Mar. 5, 2014, Codex, WordPress.Org, (Nov. 3, 2009).
"The Auto-WhiteList", http://wiki.apache.org/spamassassin/AutoWhitelist, as accessed Mar. 5, 2014, Apache SpamAssassin, (May 15, 2004).
"Add url to the whitelist in cordova.plist file in iphone at runtime with phonegap", http://stackoverflow.com/questions/11257150/add-url-to-the-whitelist-in-cordova-plist-file-in-iphone-at-runtime-with-phonega, as accessed Mar. 5, 2014, Stack Overflow, Stack Exchange Inc., (Jun. 29, 2012).
"Need URL / web address to allow auto updates to occur via whitelist & OpenDNS", http://answers.microsoft.com/en-us/protect/forum/mse-protect_updating/need-url-web-address-to-allow-auto-updates-to/a09b4c70-c115-4f74-be79-d7704d75dca7, as accessed Mar. 5, 2015, Microsoft Community, Microsoft Corporation, (Jun. 9, 2010).
"Configuring the Whitelist", https://confluence.atlassian.com/display/JIRA/Configuring+the+Whitelist, as accessed Mar. 5, 2014, Atlassian, (Mar. 20, 2011).
Beechey, Jim, "Application Whitelisting: Panacea or Propaganda?", http://www.sans.org/reading-room/whitepapers/application/application-whitelisting-panacea-propaganda-33599, as accessed Mar. 5, 2014, SANS Institute InfoSec Reading Room, (Dec. 2010).

(Continued)

*Primary Examiner* — Teshome Hailu
*Assistant Examiner* — Aubrey Wyszynski
(74) *Attorney, Agent, or Firm* — ALG Intellectual Property, LLC

(57) ABSTRACT

A computer-implemented method for preventing chronic false positives may include (1) whitelisting a file based on a challenge notification that challenges a classification of the file as insecure, (2) obtaining attribute information about the file, (3) identifying, by analyzing the attribute information, a primitive that identifies a source of origin for the file, (4) determining, based on an analysis of files that originate from the source of origin, that the source of origin identified by the primitive is trustworthy, and (5) adjusting, based on the determination that the source of origin identified by the primitive is trustworthy, a security policy associated with the primitive to prevent future false positives for other files that originate from the source of origin. Various other methods, systems, and computer-readable media are also disclosed.

20 Claims, 6 Drawing Sheets

(56) References Cited

OTHER PUBLICATIONS

"Application Whitelisting", http://archive.isa.org/FileStore/Intech/WhitePaper/Honeywell_IITS_WP_Application_Whitelisting.pdf, as accessed Mar. 5, 2014, Honewell Process Solutions, White Paper, Honeywell International Inc., (Jul. 2012).

Nick.P, "Vendor White List Option?", http://answers.microsoft.com/en-us/protect/forum/mse-protect_updating/vendor-white-list-option/f3fa3055-cbde-4326-9173-3c0a2e0a0c7b?msgId=06e6ec92-82fc-4b18-8702-238dbc0a2eae, as accessed Mar. 5, 2014, Microsoft Community, Microsoft Corporation, (Mar. 20, 2012).

Balaouras, Stephanie. "Application Whitelisting Offers a Tantalizing Alternative to Popular "Whack-A-Mole" Antivirus Strategies", http://blogs.forrester.com/stephanie_balaouras/12-09-10-application_whitelisting_offers_a_tantalizing_alternative_to_popular_whack_a_mole_antivirus_st, as accessed Mar. 5, 2014, Stephanie Balaouras' Blog, Forrester Research, Inc., (Sep. 10, 2012).

"Blog Industrial Defender", http://id.lockheedmartin.com/blog?p=28, as accessed Mar. 5, 2014, Lockheed Martin Industrial Defender, Inc., (2014).

"Kaspersky", http://usa.kaspersky.com/?domain=kaspersky.com, as accessed Mar. 5, 2014, Kaspersky Lab, (Aug. 24, 2012).

"McAfee, Inc.", http://www.mcafee.com/us/, as accessed Mar. 5, 2014, (Feb. 29, 2000).

"FireEye, Inc.", http://www.fireeye.com/, as accessed Mar. 5, 2014, (Oct. 12, 1999).

"Bit9, Inc.", https://www.bit9.com/, as accessed Mar. 5, 2014, (Feb. 2, 2001).

\* cited by examiner

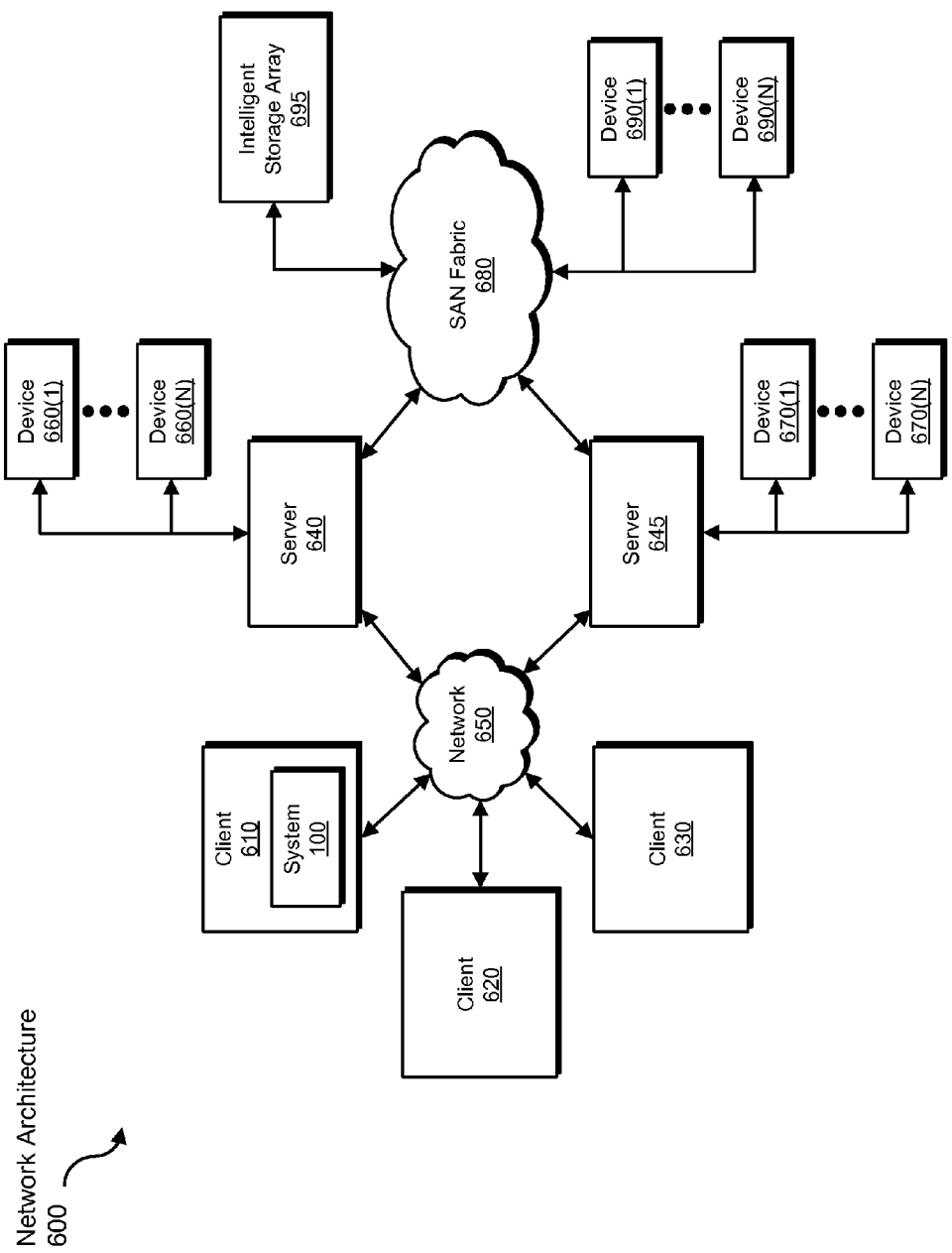

SYSTEMS AND METHODS FOR PREVENTING CHRONIC FALSE POSITIVES

BACKGROUND

Although robust and ever-improving, security products routinely misclassify secure files as insecure. These false positives can be costly and frustrating to both security vendors and their customers, which may be blocked or otherwise impeded from accessing their misclassified files. In many cases, security vendors rely on file-indexed customer reports to identify false positives. For example, a customer may send a report to a security vendor with the binary of a specific file that the security product has incorrectly classified as insecure. Upon receiving and verifying the false positive report, the security vendor may attempt to prevent the file from being misclassified in the future by calculating and whitelisting a hash of the file.

Unfortunately, file-indexed whitelists often fail to prevent whitelisted files from being misclassified if any modification is made to a whitelisted file (e.g., if a new version of the file is created or if the file is changed to a different language) since such modifications change the file's hash. This may in turn cause the security product to classify the modified file as malicious, resulting in what may be perceived by the customer as a recurrence of the false positive that the customer previously identified. The perceived recurrence of false positives may lead to frustration on the part of the customer and/or vendor, and may necessitate another round of false positive reporting, damaging the security vendor's reputation. Accordingly, the instant disclosure identifies a need for improved systems and methods for detecting false positives.

SUMMARY

As will be described in greater detail below, the instant disclosure generally relates to systems and methods for preventing chronic false positives by, for example, creating a whitelist of primitives that identify the source of origin of misclassified files. In one example, a computer-implemented method for preventing chronic false positives may include (1) whitelisting a file based on a challenge notification that challenges a classification of the file as insecure, (2) obtaining attribute information about the file, (3) identifying, by analyzing the attribute information, a primitive that identifies a source of origin for the file, (4) determining, based on an analysis of files that originate from the source of origin, that the source of origin identified by the primitive is trustworthy, and (5) adjusting, based on the determination that the source of origin identified by the primitive is trustworthy, a security policy associated with the primitive to prevent future false positives for other files that originate from the source of origin.

In some embodiments, the above-described method may include obtaining attribute information about the file by (1) updating a reputation score for the file based on the challenge notification, (2) after updating the reputation score, receiving a query from a client device for a reputation score for the file, and (3) retrieving, from the query for the reputation score, the attribute information. In some examples, the above-described method may include setting a flag that designates that a security classification of the file was challenged by the challenge notification. In these examples, the method may further include sending the flag to client devices that request the reputation score for the file, along with the reputation score. The above-described primitive may include a UNIFORM RESOURCE LOCATOR from which the file was downloaded, a publisher of the file, an INTERNET PROTOCOL address from which the file was downloaded, and/or an entity that digitally signed the file.

In some examples, the above-described method may include determining, based on an analysis of files that originate from the source of origin, that the source of origin identified by the primitive is trustworthy by determining that a predetermined number of files that originate from the same source of origin as the file are classified as secure. In these examples, the predetermined number may specify a static number and/or may specify a proportion of a total number of files that originate from the source of origin.

In some embodiments, the above-described method may include determining that the primitive is frequently associated with challenge notifications by determining that a predetermined proportion of the files that originate from the source of origin were flagged as reclassified based on a corresponding challenge notification. In further embodiments, the above-described method may include adjusting the security policy associated with the primitive to prevent future false positives by whitelisting the primitive. In these examples, the above-described method may include (1) determining that another file originates from the source of origin identified by the primitive and (2) classifying the other file as secure based on the determination that the other file originates from the source of origin identified by the primitive associated with the adjusted security policy.

In some examples, the above-described method may include periodically evaluating the accuracy of the security policy associated with the primitive. In such examples, the above-described method may include (1) determining, during the periodic evaluation, that the primitive is associated with files that are insecure more than a threshold proportion and (2) in response to determining that the primitive is associated with files that are insecure more than the threshold proportion, revoking the whitelisting of the primitive.

In one embodiment, a system for implementing the above-described method may include (1) a challenge module, stored in memory, that whitelists a file based on a challenge notification that challenges a classification of the file as insecure, (2) an identification module, stored in memory, that obtains attribute information about the file, the attribute information including a primitive that identifies a source of origin for the file, (3) a determination module, stored in memory, that determines, based on an analysis of files that originate from the source of origin, that the source of origin identified by the primitive is trustworthy, (4) an adjustment module, stored in memory, that adjusts, based on the determination that the source of origin identified by the primitive is trustworthy, a security policy associated with the primitive to prevent future false positives for other files that originate from the source of origin, and (5) at least one physical processor that executes the challenge module, the identification module, the determination module, and the adjustment module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) whitelist a file based on a challenge notification that challenges a classification of the file as insecure, (2) obtain attribute information about the file, (3) identify, by analyzing the attribute information, a primitive that identifies a source of origin for the file, (4) determine, based on an analysis of files that originate from the source of origin, that the source of origin identified by the primitive is trustworthy, and (5)

adjust, based on the determination that the source of origin identified by the primitive is trustworthy, a security policy associated with the primitive to prevent future false positives for other files that originate from the source of origin.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 6 is a block diagram of an exemplary computing network capable of implementing one or more of the embodiments described and/or illustrated herein.

Figure 1:
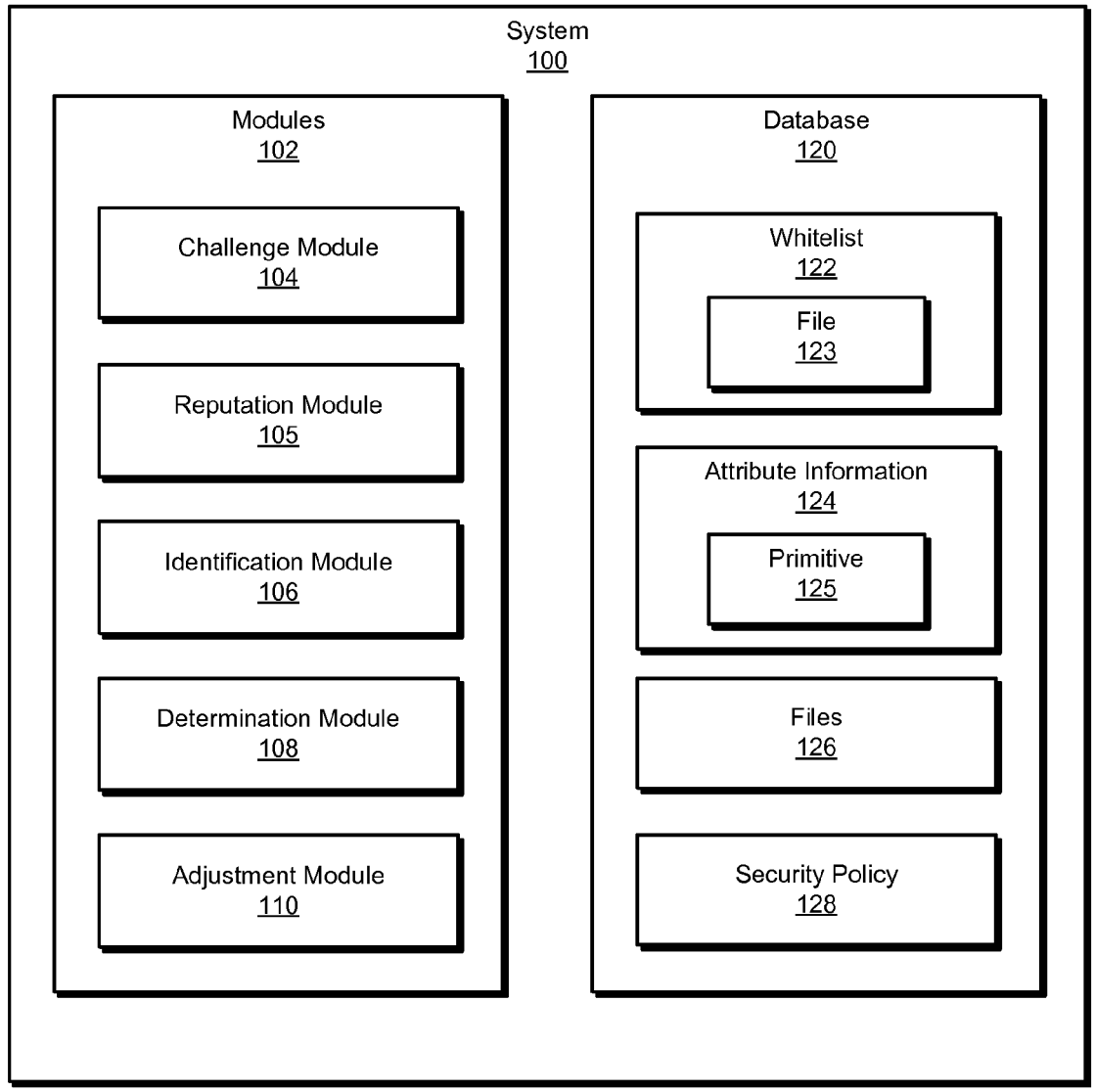
FIG. 1 is a block diagram of an exemplary system for preventing chronic false positives.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be explained in greater detail below, the instant disclosure deals with preventing chronic false positives by, for example, whitelisting a source of files instead of, or in addition to, individually whitelisting a hash of each file that originates from that source. This may in turn allow security vendors to appropriately whitelist modified files, for example, based on the sources associated with those files.

Figure 2:
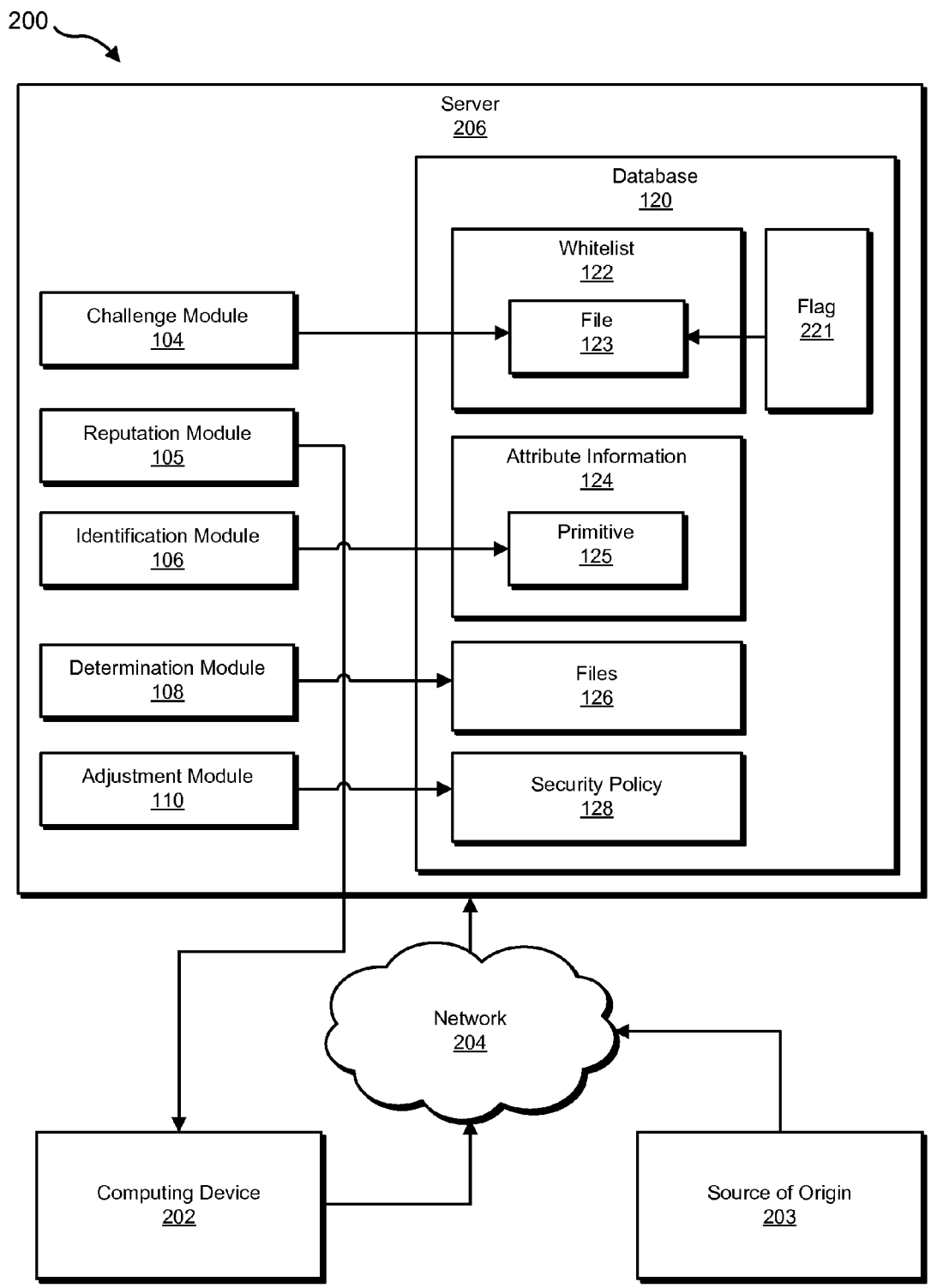
FIG. 2 is a block diagram of an additional exemplary system for preventing chronic false positives.

The following will provide, with reference to FIGS. 1-2, detailed descriptions of exemplary systems for preventing chronic false positives. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for preventing chronic false positives. As illustrated in this figure, exemplary system 100 may include one or more modules 102 for performing one or more tasks. For example, and as will be explained in greater detail below, exemplary system 100 may include (1) a challenge module 104 that whitelists a file based on a challenge notification that challenges a classification of the file as insecure, (2) a reputation module 105 that maintains and updates a reputation score for the file, (3) an identification module 106 that obtains attribute information that includes (or identifies) a primitive that identifies a source of origin for the file (and may identify the primitive by analyzing the attribute information), (4) a determination module 108 that determines, based on an analysis of files that originate from the source of origin, that the source of origin identified by the primitive is trustworthy, and (5) an adjustment module 110 that adjusts, based on the determination that the source of origin identified by the primitive is trustworthy, a security policy associated with the primitive to prevent future false positives for other files that originate from the source of origin. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store a whitelist 122, a file 123, attribute information 124, a primitive 125, files 126, and/or a security policy 128, as discussed further below.

Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as computing device 202 and/or server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 and/or a source of origin 203 via a network 204. In one example, server 206 may be programmed with one or more of modules 102 and/or may store all or a portion of the data in database 120. Additionally or alternatively, computing device 202 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to prevent chronic false positives. For example, and as will be described in greater detail below, one or more of modules 102 may cause server 206 to (1) whitelist file 123 based on a challenge notification that challenges a classification of file 123 as insecure, (2) obtain attribute information 124 about file 123, (3) identify, by analyzing attribute information 124, a primitive 125 that identifies a source of origin 203 for file 123, (4) determine, based on an analysis of files 126 that originate from source of origin 203, that source of origin 203 identified by primitive 125 is trustworthy, and (5) adjust, based on the determination that source of origin 203 identified by primitive 125 is trustworthy, security policy 128 associated with primitive 125 to prevent future false positives for other files that originate from source of origin 203.

In the example of FIG. 2, a device operated by a security vendor, such as server 206, may receive a challenge notification from a client device, such as computing device 202, indicating that file 123 is classified as insecure but is in fact a secure file. Server 206 may optionally validate the challenge notification by verifying that file 123 is secure, and, in response, may whitelist a hash of file 123 so that server 206 will not mistakenly categorize file 123 as insecure in the future. Server 206 may also update a reputation score corresponding to file 123 and associate a special flag, i.e., a flag 221, with the hash of file 123. Flag 221 may indicate that the security classification of file 123 was challenged and/or whitelisted as a result of being challenged. After whitelisting file 123, server 206 may receive user queries from a client device, such as computing device 202, for a reputation score for file 123 and, in response, may send the updated reputation score and flag 221 to the client device that sent the query.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device. In some examples, computing device 202 may correspond to a client device.

Server 206 generally represents any type or form of computing device that is capable of storing, calculating, and/or managing security classifications for files and/or primitives, as discussed below. Examples of server 206 include, without limitation, application servers and database servers configured to provide various database services and/or run certain software applications. In some examples, a security vendor may maintain server 206.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202, source of origin 203, and/or server 206.

Figure 3:
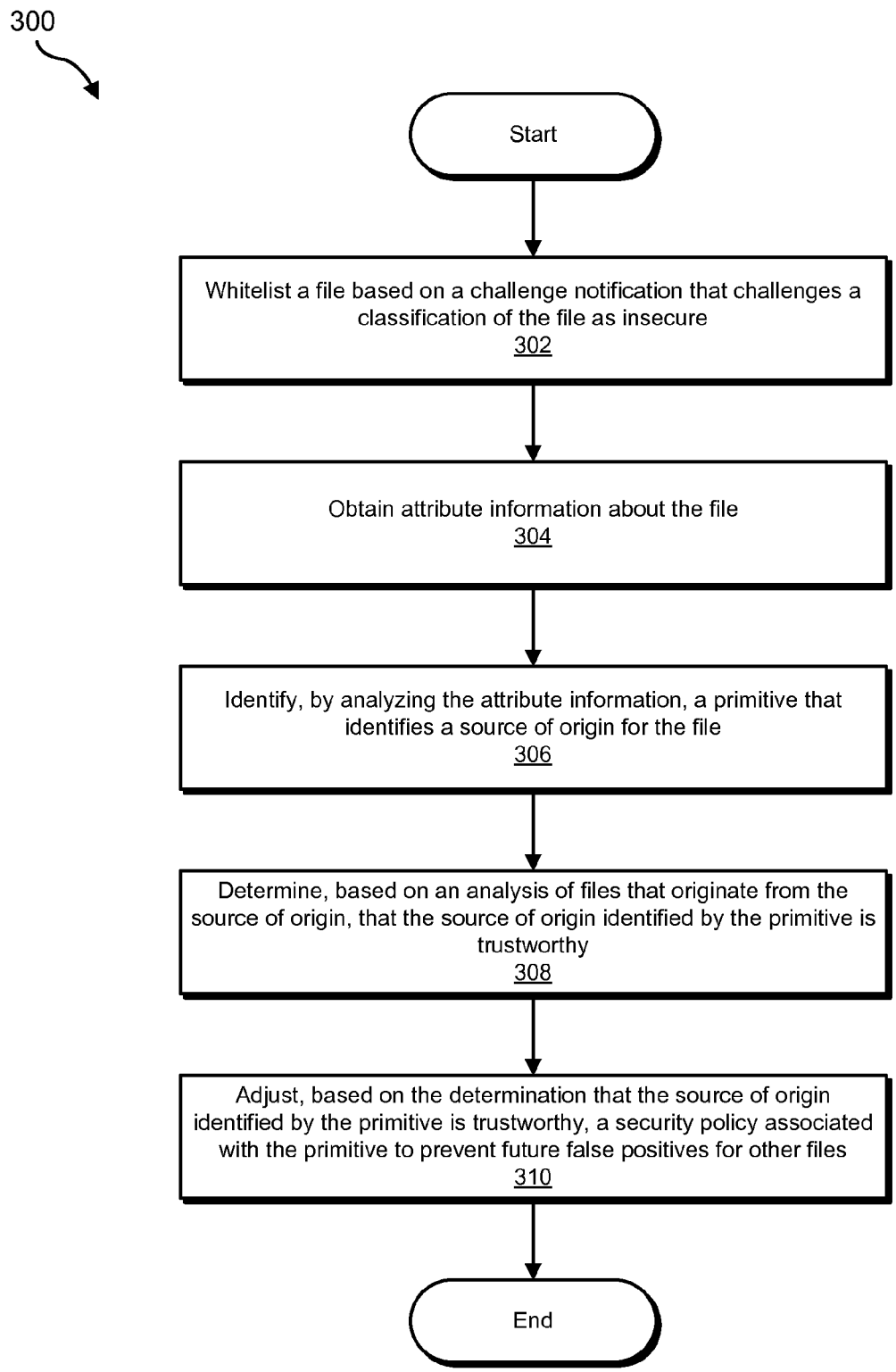
FIG. 3 is a flow diagram of an exemplary method for preventing chronic false positives.

FIG. 3 is a flow diagram of an exemplary computer-implemented method 300 for preventing chronic false positives. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302, one or more of the systems described herein may whitelist a file based on a challenge notification that challenges a classification of the file as insecure. For example, challenge module 104 may whitelist file 123 based on a challenge notification that challenges a classification of file 123 as insecure.

As used herein, the term "challenge notification" generally refers to any notification structured to indicate to a server or security vendor that a security classification is potentially incorrect. Examples of challenge notifications may include vendor disputes sent from client devices, such as computing device 202, to a device operated by a security vendor, such as server 206, that indicates to the security vendor that a file, which the security vendor classified as insecure, is, in fact, secure.

As used herein, the term "whitelist" generally refers to any list that specifies entities (e.g., files, primitives, sources of origin, metadata, features, etc.) that have satisfied a security check or evaluation to indicate a level of safety or approval for use. A whitelist may be stored in local memory, on a mass storage device, and/or on a remote machine, or distributed across one or more remote machines. In some embodiments, a whitelist may also contain information associated with the items (e.g., files) on the whitelist, such as a file name or file path (e.g., a file name and/or associated extension or a fully qualified path of a file), content authenticator, special file tags, known associations, and/or the like.

Challenge module 104 may whitelist file 123 in a variety of ways. In some examples, challenge module 104 may base the whitelisting on a challenge notification received from computing device 202. The challenge notification may indicate both that (1) a security vendor, such as a security vendor that hosts server 206, has encumbered computing device 202's ability to access file 123 by classifying file 123 as insecure and (2) computing device 202, or a user associated with computing device 202, believes that file 123 is secure.

Challenge module 104 may additionally base the whitelisting of file 123 on an independent verification of the security of file 123. In some examples, prior to whitelisting file 123, challenge module 104 may validate that file 123 is secure by performing a security scan on file 123. In these examples, challenge module 104 may only whitelist files that challenge module 104 validates as secure. In other examples, challenge module 104 may have a policy in place to only whitelist a file, such as file 123, after a user associated with challenge module 104 has verified that the file, such as file 123, is secure by manually inspecting the file.

In one example, challenge module 104 may whitelist file 123 by adding file 123 to a list of files included in whitelist 122. In some examples, one or more of the systems described herein may run a tool that calculates a hash of file 123. In these examples, challenge module 104 may whitelist file 123 by whitelisting a hash of file 123. Additionally, or alternatively, challenge module 104 may ingest a list of whitelists, such as whitelist 122, into a reputation database that may be subsequently queried to determine the security of files.

In some embodiments, challenge module 104 may, in addition to whitelisting file 123, also set a flag, such as flag 221, that designates that the security classification of file 123 was challenged by the challenge notification and/or whitelisted as a result. As will be described in greater detail below, flag 221 may be used in future reputation queries for file 123.

As illustrated in FIG. 3, at step 304, one or more of the systems described herein may obtain attribute information about the file. For example, identification module 106 may obtain attribute information 124 about file 123. As used herein, the term "attribute information" generally refers to any information relating to an attribute that is associated with file 123. In some examples, and as will be discussed in greater detail below, the attribute information may include, or indicate, a primitive that identifies source of origin 203 for file 123.

The systems described herein may obtain attribute information about the file in a variety of ways. In some examples, identification module 106 may obtain attribute information 124 about file 123 from one or more client devices, such as computing device 202. This may be done in a variety of ways. In one embodiment, reputation module 105 may update a reputation score for file 123 based on the challenge notification. After updating the reputation score, reputation module 105 may receive a query from a client device, such as computing device 202, for the reputation score corresponding to file 123. In response to receiving this query, reputation module 105 may (1) retrieve, from the query for the reputation score, the attribute information and (2) send the updated reputation score to the client device. In addition, if a flag was set for file 123 as described above in connection with step 302, identification module 106 may also send the flag to the client device in response to receiving the query. Obtaining attribute information from client devices in this manner may be useful in instances where the challenge notification that challenges the security classification of file 123 does not include sufficient information to identify a primitive that identifies a source of origin for file 123.

As illustrated in FIG. 3, at step 306, one or more of the systems described herein may identify, by analyzing the attribute information, a primitive that identifies a source of origin for the file. For example, identification module 106 may identify, by analyzing attribute information 124, primitive 125 that identifies source of origin 203 for file 123.

As used herein, the term "primitive" refers to an attribute of file 123 that identifies source of origin 203 for file 123. Examples of primitives may include, without limitation, a UNIFORM RESOURCE LOCATOR from which the file was downloaded, a publisher of the file, an INTERNET PROTOCOL address from which the file was downloaded, and/or an entity that digitally signed the file. More generally, primitive 125 may include any data or symbol that identifies an origin, source, location, history, and/or background for file 123 that file 123 may share with other, distinct files.

Identification module 106 may identify a primitive that identifies a source of origin for the file by analyzing attribute information 124 in a variety of ways. For example, identification module 106 may scan one or more primitives included in the attribute information to identify a primitive that corresponds to, e.g., a UNIFORM RESOURCE LOCATOR from which the file was downloaded, a publisher of the file, an INTERNET PROTOCOL address from which the file was downloaded, an entity that digitally signed the file, or any other attribute that identifies a source of origin.

In some examples, identification module 106 may identify a primitive that, in addition to identifying a source of origin for file 123, is associated with a security policy, the adjustment of which would likely decrease false positives. For example, identification module 106 may identify a primitive, such as primitive 125, that, in addition to identifying a source of origin for file 123, is frequently associated with files that are the subject of challenge notifications.

Figure 4:
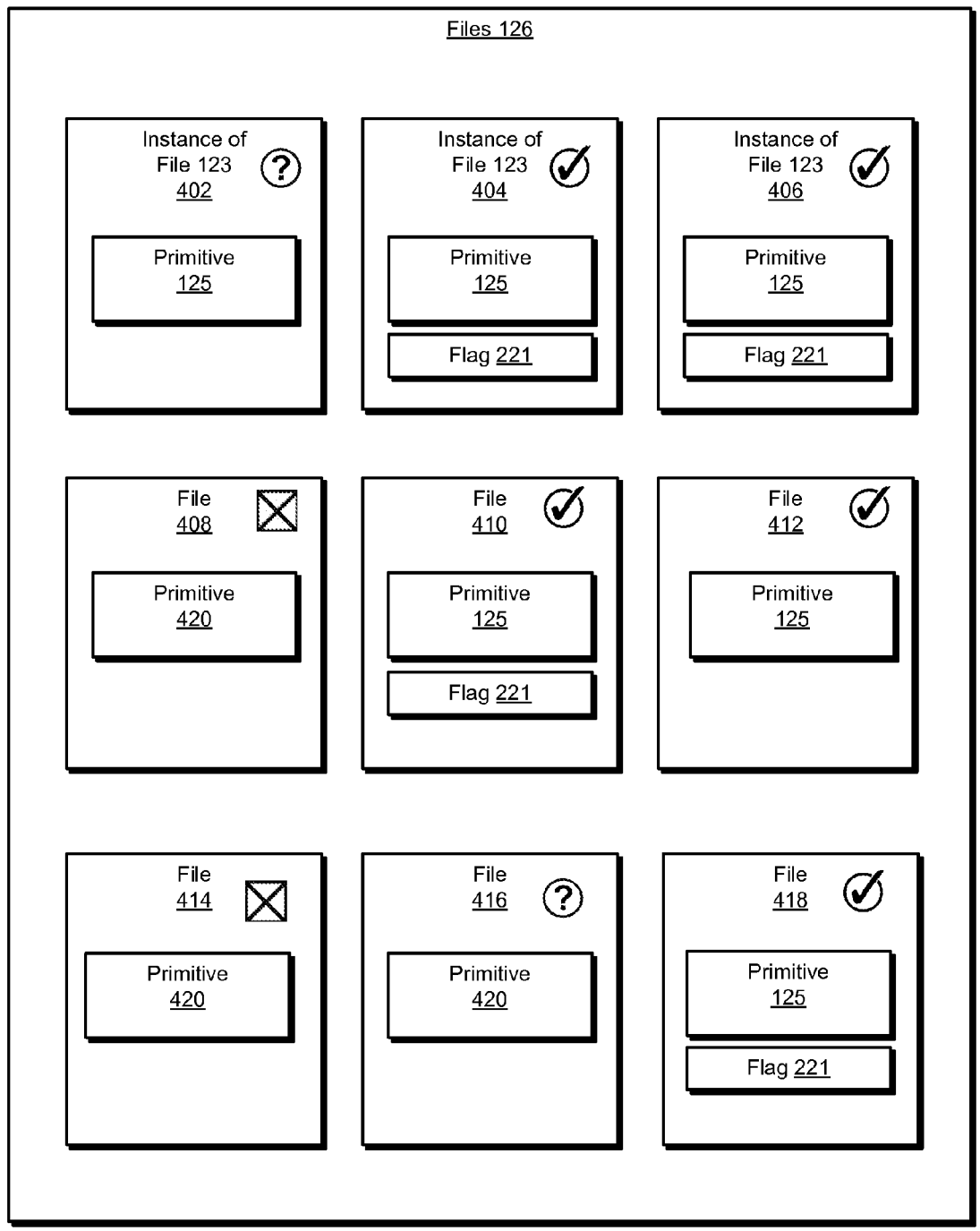
FIG. 4 is a block diagram of files maintained in a database along with the primitives and security classifications associated with each file.

Identification module 106 may identify primitives that are frequently associated with files that are the subject of challenge notifications in a variety of ways. For example, and as illustrated in FIG. 4, identification module 106 may determine that primitive 125 is frequently associated with files that are the subject of challenge notifications by determining that a predetermined proportion of files that include primitive 125 were the subject of a challenge notification. FIG. 4 shows exemplary files (or file instances) 402-418, which may each be classified as safe (as indicated by a checkmark), unknown (as indicated by a question mark), or unsafe (as indicated by an x mark). The instances of files may also be associated with primitives, such as primitive 125 and a primitive 420, and may be flagged by flag 221 in some cases. In this example, identification module 106 may determine that primitive 125 is frequently associated with challenge notifications because four of the six files, within a set of files (e.g., files 126) associated with primitive 125, were the subjects of challenge notifications (i.e., files 404, 406, 410, and 418). In this case, the ratio of 4/6 may be larger than a threshold ratio, such as 1/6 or 1/2, such that primitive 125 should be whitelisted to prevent chronic future false positives, as indicated by flag 221.

Files 126 may include all files identified over a period of time and/or received from specified locations by server 206, for example, such that files 126 may serve as a data set for analysis and identifying primitives for whitelisting. In other examples, identification module 106 may determine that primitive 125 is frequently associated with files that are the subject of challenge notifications by determining that a static number of files that include primitive 125 were the subject of a challenge notification. In this example, identification module 106 may determine that primitive 125 is frequently associated with challenge notifications because four files that include primitive 125 were the subjects of challenge notifications. The static number four may be larger than a predetermined threshold, such as 2 or 3 (outside of the example of FIG. 4, in the practical world of security vendors, the predetermined threshold may be much larger, in the dozens, hundreds, or thousands, for example). As further shown in FIG. 4, the threshold calculations discussed above may be performed on a file instance basis (e.g., including numerous instances of a same file) and/or file basis (e.g., where different instances of the same file are counted as a single file for purposes of the calculation).

In embodiments where a flag is set for files that are challenged, as described above in connection with step 302, identification module 106 may determine that a file has been the subject of a challenge notification by determining that the file was flagged as reclassified based on a corresponding challenge notification. For example, identification module 106 may determine that files 404, 406, 410, and 418 were each the subject of a challenge notification because each includes flag 221.

As illustrated in FIG. 3, at step 308, one or more of the systems described herein may determine, based on an analysis of files that originate from the source of origin, that the source of origin identified by the primitive is trustworthy. For example, determination module 108 may determine, based on an analysis of files from files 126 that originate from source of origin 203, that source of origin 203 identified by primitive 125 is trustworthy.

As used herein, a trustworthy source of origin generally refers to a source of origin that has not been compromised by unsafe, dangerous, unwanted, and/or otherwise illegitimate activities. Unsafe, dangerous, unwanted, and/or otherwise illegitimate activities may include a variety of online activities, such as phishing and/or other types of fraud and/or abuse, cybersquatting, legal and/or illegal pornography, transmitting spam, pop-up messages, and/or any other types of unwanted communications, viruses, malicious code, spyware, Trojans, and/or other security threats.

In some examples, determination module 108 may determine, that source of origin 203 identified by primitive 125 is trustworthy by determining that a predetermined number of files 126 that originate from source of origin 203 are classified as secure. In some instances, the predetermined number of files 126 may include a static number (e.g., a hundred files). In other instances, the predetermined number of files 126 may specify a proportion of a total number of files from files 126 that originate from source of origin 203 (e.g., 80% of the total number of files).

Returning to FIG. 4, this figure depicts six files (and/or file instances) that include primitive 125 and thus originate from source of origin 203 (i.e., files 402, 404, 406, 410, 412, and 418). Five of these files are classified as secure (i.e., files 404, 406, 410, 412, and 418). In this example, determine module 108 may determine that source of origin 203 identified by primitive 125 is trustworthy by determining that five of the files that originate from source of origin 203 are classified as secure (e.g., if the predetermined static number were five or more) and/or by determining that 83% (i.e., 5 out of 6) of the files that originate from source of origin 203 are classified as secure (e.g., if the predetermined proportion were 80% or more). As used herein, "total number of files" may refer to a total number of files, maintained in database 120, that originate from source of origin 203.

As illustrated in FIG. 3, at step 310, one or more of the systems described herein may adjust, based on the determination that the source of origin identified by the primitive is trustworthy, a security policy associated with the primitive to prevent future false positives for other files that originate from the source of origin. For example, adjustment module 110 may adjust, based on the determination that source of origin 203 identified by primitive 125 is trustworthy, a security policy 128 associated with primitive 125 to prevent future false positives for other files that originate from source of origin 203.

As used herein, the term "security policy" may generally refer to a policy that is directed at protecting the security of a device. For example, a security policy might include instructions directed at protecting a device from malware. In some examples, security policy 128 may be adjusted to include an instruction to whitelist primitive 125 and/or increase a security score for primitive 125 (more generally, an instruction to increase permitted access for files or entities associated with primitive 125). In these examples, one or more of the systems described herein may (1) determine that another file originates from the source of origin identified by primitive 125 and (2) classify the other file as secure based on the determination that the other file originates from source of origin 203 identified by the primitive 125 and associated with the adjusted security policy 128.

In some examples, adjustment module 110 may periodically evaluate the accuracy of adjusted security policy 128 for primitive 125. In response to determining that the primitive is associated with files that are insecure more than the threshold proportion, adjustment module 110 may revoke the whitelisting of primitive 125.

As explained in greater detail above, the instant disclosure deals with preventing chronic false positives by, for example, whitelisting a source of files instead of, or in addition to, individually whitelisting a hash of each file that originates from that source. This may in turn allow security vendors to appropriately whitelist modified files, for example, based on the sources associated with those files.

Figure 5:
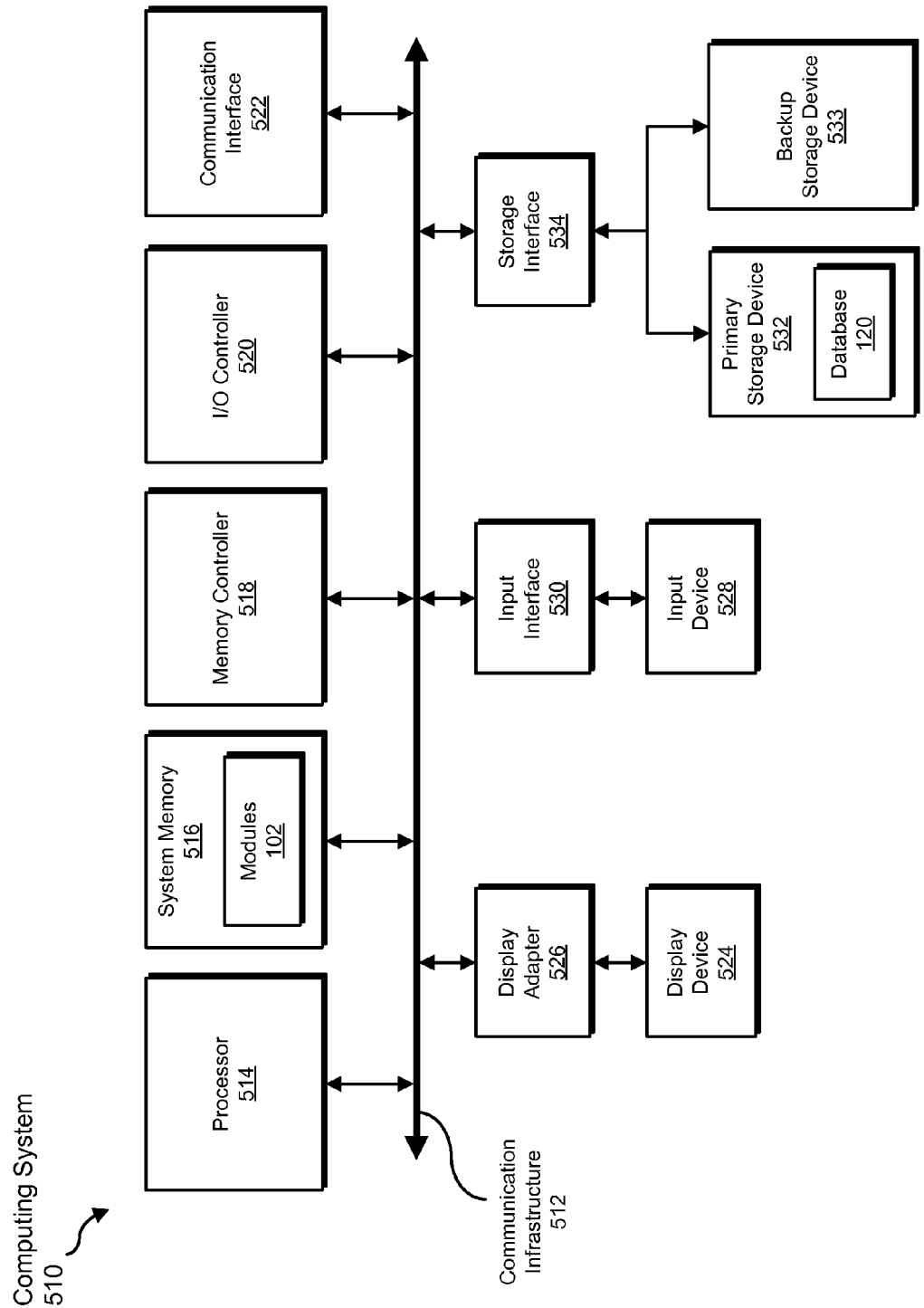
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary server 260.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for preventing chronic false positives.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may (1) transform a classification of a file as insecure to a classification of the file as secure and/or (2) transform a hash-based whitelist to a primitive-based whitelist. These modules may similarly (1) receive a file classification, file, file hash, and/or request for file reputation, (2) transform one or more of these by generating a primitive-based whitelist and/or correcting a classification for a file and/or primitive, (3) output a result of the transformation to a whitelist, database, and/or security program, (4) use a result of the transformation to prevent chronic false positives and/or protect users from malicious files, and/or (5) store a result of the transformation to a memory or disk. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preventing chronic false positives, at least a portion of the method being performed by a computing device comprising at least one processor, the method comprising:

whitelisting a file based on a challenge notification that challenges a classification of the file as insecure;

obtaining attribute information about the file;

identifying, by analyzing the attribute information, a primitive that identifies a source of origin for the file;

determining, based on an analysis of files that originate from the source of origin, that the source of origin identified by the primitive is trustworthy;

adjusting, based on the determination that the source of origin identified by the primitive is trustworthy, a security policy associated with the primitive to prevent future false positives for other files that originate from the source of origin.

2. The computer-implemented method of claim 1, further comprising updating a reputation score for the file based on the challenge notification, wherein obtaining the attribute information about the file comprises:

after updating the reputation score, receiving a query from a client device for the reputation score for the file;

retrieving, from the query for the reputation score, the attribute information.

3. The computer-implemented method of claim 2, further comprising setting a flag that designates that a security classification of the file was challenged by the challenge notification.

4. The computer-implemented method of claim 3, further comprising sending the flag and the reputation score to the client device.

5. The computer-implemented method of claim 1, wherein the primitive comprises at least one of:
   a UNIFORM RESOURCE LOCATOR from which the file was downloaded;
   a publisher of the file;
   an INTERNET PROTOCOL address from which the file was downloaded;
   an entity that digitally signed the file.

6. The computer-implemented method of claim 1, wherein determining that the source of origin identified by the primitive is trustworthy comprises determining that a predetermined number of the files that originate from the source of origin are classified as secure.

7. The computer-implemented method of claim 6, wherein the predetermined number of the files specifies a proportion of a total number of files that originate from the source of origin.

8. The computer-implemented method of claim 1, further comprising determining that the primitive is frequently associated with challenge notifications by determining that at least a predetermined proportion of the files that originate from the source of origin were flagged as reclassified based on a corresponding challenge notification.

9. The computer-implemented method of claim 1, wherein adjusting the security policy associated with the primitive comprises whitelisting the primitive.

10. The computer-implemented method of claim 9, further comprising:
    determining that another file originates from the source of origin identified by the primitive;
    classifying the other file as secure based on the determination that the other file originates from the source of origin identified by the primitive associated with the adjusted security policy.

11. The computer-implemented method of claim 9, further comprising periodically evaluating the accuracy of the security policy associated with the primitive.

12. The computer-implemented method of claim 11, further comprising:
    determining, during the periodic evaluation, that the primitive is associated with files that are insecure more than a threshold proportion;
    in response to determining that the primitive is associated with files that are insecure more than the threshold proportion, revoking the whitelisting of the primitive.

13. A system for preventing chronic false positives, the system comprising:
    a challenge module, stored in memory, that whitelists a file based on a challenge notification that challenges a classification of the file as insecure;
    an identification module, stored in memory, that obtains attribute information about the file, the attribute information including a primitive that identifies a source of origin for the file;
    a determination module, stored in memory, that determines, based on an analysis of files that originate from the source of origin, that the source of origin identified by the primitive is trustworthy;
    an adjustment module, stored in memory, that adjusts, based on the determination that the source of origin identified by the primitive is trustworthy, a security policy associated with the primitive to prevent future false positives for other files that originate from the source of origin;
    at least one physical processor that executes the challenge module, the identification module, the determination module, and the adjustment module.

14. The system of claim 13, further comprising a reputation module, stored in memory, that:
    updates a reputation score for the file based on the challenge notification;
    after updating the reputation score, receives a query from a client device for the reputation score for the file;
    retrieves, from the query for the reputation score, the attribute information.

15. The system of claim 14, wherein the challenge module sets a flag that designates that a security classification of the file was challenged by the challenge notification.

16. The system of claim 15, wherein the reputation module sends the flag and the reputation score to the client device.

17. The system of claim 13, wherein the determination module determines that the source of origin identified by the primitive is trustworthy by determining that a predetermined number of the files that originate from the source of origin are classified as secure.

18. The system of claim 17, wherein the predetermined number of the files specifies a proportion of a total number of files that originate from the source of origin.

19. The system of claim 13, wherein the adjustment module adjusts the security policy associated with the primitive by whitelisting the primitive.

20. A non-transitory computer-readable medium comprising one or more computer-executable instructions that, when executed by at least one processor of a computing device, cause the computing device to:
    whitelist a file based on a challenge notification that challenges a classification of the file as insecure;
    obtain attribute information about the file;
    identify, by analyzing the attribute information, a primitive that identifies a source of origin for the file;
    determine, based on an analysis of files that originate from the source of origin, that the source of origin identified by the primitive is trustworthy;
    adjust, based on the determination that the source of origin identified by the primitive is trustworthy, a security policy associated with the primitive to prevent future false positives for other files that originate from the source of origin.

* * * * *